May 8, 1923.  1,454,794
O. SMREKER
PROCESS FOR THE MANUFACTURE OF RAILROAD SLEEPERS AND THE LIKE OF
REENFORCED CONCRETE
Filed July 2, 1921
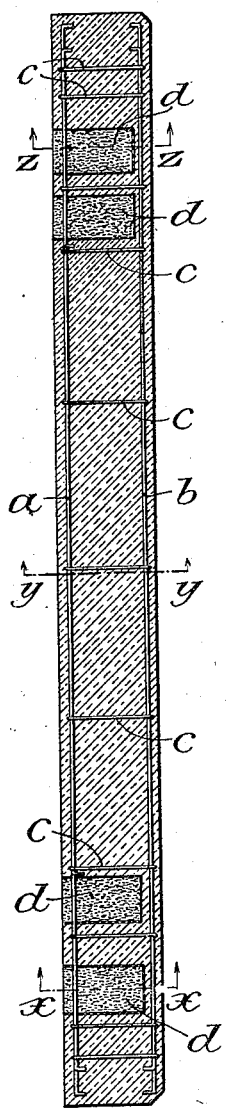
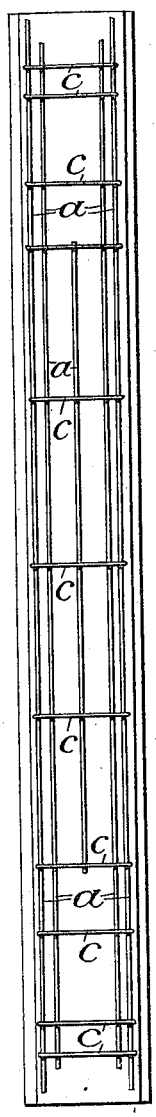
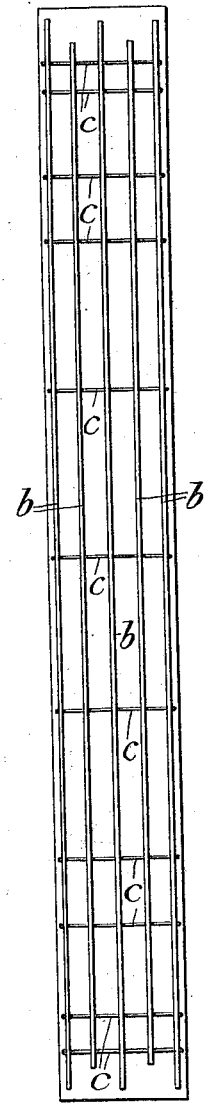
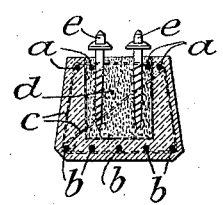
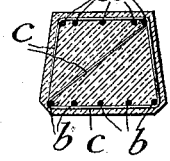
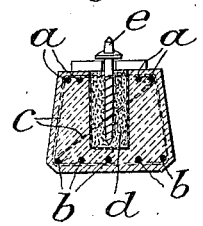
Inventor:
Oscar Smreker Patented May 8, 1923.

1,454,794

UNITED STATES PATENT OFFICE.

OSCAR SMREKER, OF LUCERNE, SWITZERLAND, ASSIGNOR TO THE FIRM INTERNATIONALE-SIEGWARTBALKEN-GESELLSCHAFT, OF LUCERNE, SWITZERLAND.

PROCESS FOR THE MANUFACTURE OF RAILROAD SLEEPERS AND THE LIKE OF REENFORCED CONCRETE.

Application filed July 2, 1921. Serial No. 482,272.

*To all whom it may concern:*

Be it known that I, OSCAR SMREKER, a citizen of the Republic of Yugoslovakia, residing at Lucerne, Switzerland, have invented certain new and useful Improvements in a Process for the Manufacture of Railroad Sleepers and the like of Reenforced Concrete; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to a process for the manufacture of railroad sleepers or the like of concrete and particularly to the manufacture of railroad sleepers with insertions of elastic, machinable concrete, for instance, asbestos cement.

With the hitherto known sleepers made of concrete with insertions of elastic concrete, the sleepers are provided with comparatively large cushions of asbestos cement at the rail seats so that the rails or the sole-plates rest solely on the parts of the sleepers made of asbestos cement and not on the parts made of ordinary concrete.

In manufacturing such sleepers considerable differences in the strength of the parts made of asbestos cement have presented themselves resulting from faults in the manufacture that can hardly be avoided. In consequence thereof with sleepers in which the parts made of asbestos cement are of a comparatively low strength or power of resistance the sole plates of the rails will penetrate into said parts and will crush the asbestos cement whereby the sleepers are rendered useless prematurely.

The object of the present invention is to avoid the above mentioned disadvantages and to reduce at the same time the cost of manufacturing sleepers of this type.

According to the process forming the object of this invention insertions consisting of an elastic concrete containing asbestos, silicate cotton and the like are only provided at the places serving to take up the means for connecting the sleepers and the like to other constructional parts.

Preferably the insertions consisting of elastic concrete are manufactured separately and these parts are, before hardening, brought into suitable parts of the mould in which the sleeper is made and the concrete is then rammed around said parts whereby a homogenous binding up of the two materials at their contacting surface results.

The insertions may also be manufactured separately and may be inserted into said moulds after hardening.

Further when manufacturing sleepers and the like suitable recesses may be provided in the part of the sleeper made of concrete, into which recesses the elastic concrete is filled in subsequently.

One constructional example of the reenforced concrete sleeper manufactured according to the process forming the subject matter of the present invention is illustrated on the accompanying drawing in which:

Fig. 1 is a longitudinal section through a sleeper,

Figs. 2 and 3 are plan views of the upper and the lower reenforcement bars respectively and Figs. 4-6 are cross-sections along the lines $x$—$x$, $y$—$y$ and $z$—$z$ respectively of Fig. 1.

The reinforcement bars $a$ and $b$ consist of straight bars of round iron of suitable length, the ends of which are bent. Said bars are of such a length and are so placed that the parts of the sleeper, in which the insertions $d$ of the elastic concrete are provided can be kept free of said bars. In the transverse direction of the sleeper the bars are linked together by member $c$. A length of strap iron is bent to hook over one of the lateral bars $a$ or $b$ herein shown as the right hand reenforcing corner bar $a$, is then passed around all the bars back to the first mentioned bar, turned around it and passed diagonally to the opposite lower corner bar $b$ and hooked thereon. $e$ denotes the means for fastening the rails to the sleepers.

The sleepers provided with comparatively small insertions of elastic concrete at the parts serving to take up the fastening means or sole plates present the advantage, that the rails or sole plates rest for the greatest part on the resistant ordinary concrete of the sleeper so that a destruction of the insertions of elastic concrete is avoided.

Experiments have shown that with sleepers manufactured according to the above mentioned process the same smooth running is attained as with the hitherto known sleepers provided with the large cushions of asbestos cement. This results from the fact that the cause of the smooth running is not the elastic support as such but the fastening of the securing means such as coach screws or rail-spikes in the elastic asbestos cement whereby the shocks are transmitted in an elastic manner to the whole sleeper.

I claim:

1. The process of manufacturing reenforced railroad sleepers and the like provided with insertions of elastic machinable concrete, which consists in manufacturing separately the insertions of elastic machinable concrete, placing said insertions before hardening into the mould in which the sleeper is made at the places which the means for securing the rails to the sleeper will occupy, and in ramming concrete around the insertions.

2. The process of manufacturing reenforced railroad sleepers and the like provided with insertions of elastic machinable concrete, which consists in manufacturing separately the insertions of asbestos cement, placing said insertions before hardening into the mould in which the sleeper is made at the places which the means for securing the rails to the sleeper will occupy, and in ramming concrete around the insertions.

In testimony that I claim the foregoing as my invention, I have signed my name.

Dr. OSCAR SMREKER.